US012401146B2

(12) United States Patent
Gieski et al.

(10) Patent No.: US 12,401,146 B2
(45) Date of Patent: Aug. 26, 2025

(54) CARD-EDGE CONNECTOR SYSTEM WITH BUSBAR CONNECTION FOR HIGH-POWER APPLICATIONS

(71) Applicants: FCI USA LLC, Etters, PA (US); AMPHENOL COMMERCIAL PRODUCTS (CHENGDU) CO., LTD., Sichuan (CN)

(72) Inventors: Christopher S. Gieski, Dillsburg, PA (US); Rongzhe Guo, Chengdu (CN)

(73) Assignee: FCI USA LLC, Etters, PA (US)

( * ) Notice: Subject to any disclaimer, the term of this patent is extended or adjusted under 35 U.S.C. 154(b) by 380 days.

(21) Appl. No.: 17/784,076

(22) PCT Filed: Dec. 12, 2019

(86) PCT No.: PCT/CN2019/124770
§ 371 (c)(1),
(2) Date: Jun. 9, 2022

(87) PCT Pub. No.: WO2021/114162
PCT Pub. Date: Jun. 17, 2021

(65) Prior Publication Data
US 2023/0006379 A1 Jan. 5, 2023

(51) Int. Cl.
*H01R 12/71* (2011.01)
*H01R 12/73* (2011.01)

(52) U.S. Cl.
CPC ......... *H01R 12/716* (2013.01); *H01R 12/732* (2013.01)

(58) Field of Classification Search
CPC ..... H01R 31/02; H01R 12/716; H01R 12/732
See application file for complete search history.

(56) References Cited

U.S. PATENT DOCUMENTS 5,030,108 A 7/1991 Babow et al.
5,221,218 A 6/1993 Marach
(Continued)

FOREIGN PATENT DOCUMENTS

CN 2490737 Y 5/2002
CN 101082825 A 12/2007
(Continued)

OTHER PUBLICATIONS

International Search Report and Written Opinion mailed Sep. 16, 2020 in connection with International Application No. PCT/CN2019/124770.
(Continued)

*Primary Examiner* — Marcus E Harcum
(74) *Attorney, Agent, or Firm* — Wolf, Greenfield & Sacks, P.C.

(57) ABSTRACT

A connector that enables electronic assemblies to be efficiently configured for any of multiple power requirements. The connector may have multiple interfaces such that when the connector is mounted to a printed circuit board (PCB), it may receive power through an interface and distribute it to components on the PCB through another interface. The connector may also have an interface that supports a connection to a conductive interconnect, which may distribute power to a second connector mounted to the same PCB. Power may be distributed to components mounted to the PCB without passing through the mounting interface of the first connector. As a result, the current density in the PCB adjacent the first connector is reduced relative to current density required to supply current to all components through the mounting interface of the first connector. The PCB may have fewer layers than a conventional PCB assembly supporting comparable functionality.

25 Claims, 11 Drawing Sheets

(56) References Cited

U.S. PATENT DOCUMENTS

| | | | | |
|---|---|---|---|---|
| 5,440,755 | A * | 8/1995 | Harwer | H05K 1/14 710/105 |
| 5,797,757 | A | 8/1998 | Aoki | |
| 6,024,589 | A | 2/2000 | Hahn, IV et al. | |
| 6,036,508 | A | 3/2000 | Anderson et al. | |
| 6,780,018 | B1 | 8/2004 | Shipe | |
| 6,780,027 | B2 | 8/2004 | Allison | |
| 6,848,948 | B1 | 2/2005 | Khemakhem et al. | |
| 6,848,950 | B2 | 2/2005 | Allison et al. | |
| 6,994,598 | B2 | 2/2006 | Holmes et al. | |
| 7,073,953 | B2 * | 7/2006 | Roth | G02B 6/3882 385/59 |
| 7,578,704 | B2 * | 8/2009 | Yang | H01R 12/707 439/654 |
| 7,704,079 | B2 * | 4/2010 | Weiss | H01R 13/6598 439/79 |
| 7,848,115 | B2 * | 12/2010 | Casto | H05K 1/14 361/802 |
| 7,976,317 | B2 | 7/2011 | Patel et al. | |
| 8,038,451 | B2 * | 10/2011 | Peterson | H01R 12/7011 439/65 |
| 8,045,340 | B2 * | 10/2011 | Heinrichs | G06F 1/185 361/810 |
| 8,057,266 | B1 | 11/2011 | Roitberg | |
| 8,435,047 | B2 | 5/2013 | Patel et al. | |
| 8,573,983 | B2 | 11/2013 | Zieder | |
| 8,610,316 | B2 | 12/2013 | Spitaels et al. | |
| 8,690,589 | B2 * | 4/2014 | Ngo | H01R 12/721 439/79 |
| 8,979,562 | B2 * | 3/2015 | Crighton | H01R 12/7088 438/66 |
| 9,478,885 | B2 * | 10/2016 | MacDougall | H01R 12/73 |
| 9,559,446 | B1 | 1/2017 | Wetzel et al. | |
| 9,691,580 | B2 * | 6/2017 | von zur Muehlen | H01H 85/2015 |
| 10,014,601 | B1 * | 7/2018 | Nakazawa | H01M 50/507 |
| 10,020,603 | B1 * | 7/2018 | Liu | H01R 12/737 |
| 10,096,920 | B2 | 10/2018 | Lee | |
| 10,170,868 | B1 * | 1/2019 | Oyake | H01R 13/652 |
| 10,522,945 | B2 * | 12/2019 | Schneider | H01R 13/10 |
| 10,581,196 | B2 * | 3/2020 | Liu | H01R 25/162 |
| 10,784,631 | B2 | 9/2020 | Brungard et al. | |
| 10,980,117 | B1 * | 4/2021 | Maas | G06F 30/331 |
| 11,539,154 | B2 | 12/2022 | Horning et al. | |
| 2003/0219999 | A1 * | 11/2003 | Minich | H01R 12/7088 439/79 |
| 2006/0223385 | A1 | 10/2006 | Pavlovic et al. | |
| 2007/0293084 | A1 | 12/2007 | Ngo | |
| 2009/0246990 | A1 | 10/2009 | Yang et al. | |
| 2010/0167593 | A1 * | 7/2010 | Yu | H01R 13/055 439/651 |
| 2012/0190219 | A1 | 7/2012 | Pai et al. | |
| 2014/0051269 | A1 * | 2/2014 | Chang | H01R 12/722 439/68 |
| 2015/0282319 | A1 * | 10/2015 | Salzman | H05K 1/141 361/788 |
| 2016/0013570 | A1 * | 1/2016 | Fry, Jr. | H01R 12/7076 29/842 |
| 2016/0093963 | A1 | 3/2016 | Streckewald | |
| 2016/0338191 | A1 | 11/2016 | Tanaka et al. | |
| 2017/0003010 | A1 * | 1/2017 | Mostoller | H01R 13/28 |
| 2019/0288450 | A1 | 9/2019 | Brungard | |
| 2019/0288466 | A1 | 9/2019 | Copper et al. | |
| 2019/0296507 | A1 * | 9/2019 | Fukami | B60R 16/02 |
| 2022/0224034 | A1 | 7/2022 | Do et al. | |
| 2022/0255250 | A1 | 8/2022 | Gieski et al. | |
| 2022/0329014 | A1 | 10/2022 | Zi et al. | |
| 2023/0163528 | A1 | 5/2023 | Gieski | |

FOREIGN PATENT DOCUMENTS

| | | | |
|---|---|---|---|
| CN | 102282728 | A | 12/2011 |
| CN | 202384604 | U | 8/2012 |
| CN | 207853027 | U | 9/2018 |
| CN | 109787004 | A | 5/2019 |
| DE | 102016218018 | A1 | 3/2018 |
| EP | 3477776 | A1 | 5/2019 |
| GB | 2342789 | A | 4/2000 |
| TW | M449366 | U | 3/2013 |
| TW | 201817089 | A | 5/2018 |
| TW | 109143931 | | 9/2024 |
| WO | WO 2015/112773 | A1 | 7/2015 |

OTHER PUBLICATIONS

International Search Report and Written Opinion mailed May 20, 2022 in connection with International Application No. PCT/US2022/015609.

U.S. Appl. No. 17/666,498, filed Feb. 7, 2022, Gieski et al.

PCT/CN2019/124770, Sep. 16, 2020, International Search Report and Written Opinion.

PCT/US2022/015609, May 20, 2022, International Search Report and Written Opinion.

Gieski et al., Electrical Connector For High Power Computing System, U.S. Appl. No. 18/961,851, filed Nov. 27, 2024.

U.S. Appl. No. 17/991,751, filed Nov. 21, 2022, Gieski.

Taiwanese Office Action dated Sep. 26, 2024 in connection with Taiwanese Application No. 109143931.

* cited by examiner

CARD-EDGE CONNECTOR SYSTEM WITH BUSBAR CONNECTION FOR HIGH-POWER APPLICATIONS

CROSS-REFERENCE TO RELATED APPLICATIONS

This application is a 35 U.S.C. § 371 National Phase filing of International Application No. PCT/CN2019/124770, filed on Dec. 12, 2019, entitled "CARD-EDGE CONNECTOR SYSTEM WITH BUSBAR CONNECTION FOR HIGH-POWER APPLICATIONS," the entire contents of which are incorporated herein by reference in their entirety.

FIELD OF THE DISCLOSURE

The technology disclosed herein relates generally to electrical interconnection systems and more specifically to edge-type electrical connectors and busbars usable in high-power applications.

BACKGROUND

Electrical connectors are used in many electrical systems. Electronic devices have been provided with assorted types of connectors whose primary purpose is to enable data, commands, power and/or other signals to pass between electronic assemblies. It is generally easier and more cost effective to manufacture an electrical system as separate electronic assemblies that may be joined with electrical connectors. For example, one type of electronic assembly is a printed circuit board ("PCB"). The terms "card" and "PCB" may be used interchangeably herein.

In some scenarios, a two-piece connector is used to join two assemblies. One connector may be mounted to each of the assemblies. The connectors may be mated, forming connections between the two assemblies.

In other scenarios, a PCB may be joined directly to another electronic assembly via a one-piece connector, which may be configured as a card edge connector. The PCB may have pads along an edge that is designed to be inserted into an electrical connector attached to another assembly. Contacts within the electrical connector may contact the pads, thus connecting the PCB to the other assembly through the connector.

In some scenarios, busbars may be routed through an electronic device to distribute power to electronic assemblies within the device. The electronic assemblies may be connected to the busbar through connectors or screws.

SUMMARY

According to some aspects of the present technology, a card-edge connector includes a busbar input. The connector may comprise a housing comprising a first face, a second face, and a third face with a first interface at the first face, a second interface at the second face, and a third interface at the third face. The connector may also include a plurality of conductive elements held within the housing, the plurality of conductive elements comprising a first set of mating contact portions, a second set of mating contact portions, and a set of mounting portions. The mating contact portions of the first set of mating contact portions may be electrically connected to respective mating contact portions of the second set of mating contact portions and respective mounting portions of the set of mounting portions. The first set of mating contact portions may comprise the first interface, the second set of mating contact portions may comprise the second interface, and the set of mounting portions may comprise the third interface.

The first interface of the card-edge connector may be configured to receive a card edge. The second interface of the card-edge connector may be configured to receive at least one busbar, and may be configured to receive a current between 60 Amps and 100 Amps, or between 160 Amps and 240 Amps, in some embodiments.

The first and second interfaces of the card-edge connector may be offset by an angle between 70 degrees and 110 degrees. The first set of fingers and the second set of fingers of the card-edge connector may also offset by an angle between 70 degrees and 110 degrees. The card-edge connector may have an angular offset between the first interface and the second interface that is equal to the angular offset of the first set of fingers and the second set of fingers.

The card-edge connector may have a first face perpendicular to the second face and the third face; and a second face that is parallel to the third face.

According to some aspects of the present technology, an electronic system may comprise a printed circuit board (PCB) and a first connector. The first connector may comprise a first mating interface, a second mating interface, and a first mounting interface. The first mating interface, the second mating interface and the first mounting interface may be electrically connected, and the first connector may be mounted to the PCB at the first mounting interface. A second connector may comprise a third mating interface, wherein the third mating interface and the second mounting interface are electrically connected. The second connector may be mounted to the PCB at the second mounting interface. A conductive interconnect may be separably connected to the second mating interface and the third mating interface.

In some embodiments, an electronic system may have a conductive interconnect configured to carry in excess of 60 Amps or, in some embodiments, 100 Amps, and may comprise at least one bus bar or at least one cabled interconnect. The electronic system may further comprise a power supply separably connected to the first mating interface. The power supply may be configured as a 60 Amp supply, or it may be configured to supply a maximum current between 160 Amps and 240 Amps.

In the electronic system, the conductive interconnect may comprise a busbar that traverses a bend in a plane parallel to the PCB that is between 70 degrees and 110 degrees.

According to other aspects of the present technology, an electronic system comprising a printed circuit board (PCB), a first connector mounted to the PCB and comprising at least one mating interface, a second connector having at least one mating interface mounted to the PCB, and a plurality of electronic components mounted to the PCB, may be operated according to a method comprising supplying power through a mating interface of the at least one mating interface of the first connector; distributing a first portion of the supplied power to the plurality of electronic components from the first connector through power planes in the PCB; and distributing a second portion or the supplied power to the plurality of electronic components from the first connector through a conductive interconnect to the second connector and from the second connector through power planes in the PCB is provided.

The method may involve distributing the first portion of the supplied power to the plurality of electronic components from the first connector through 15 or fewer power planes.

The first portion of the supplied power and the second portion of the supplied power may be, in the aggregate, in excess of 60 Amps, 90 Amps, or 180 Amps, according to various embodiments.

The mating interface may be a first mating interface of the first connector, and the first connector may comprise a second mating interface. The at least one mating interface of the second connector may comprise a first mating interface, and the method may further comprise connecting the conductive interconnect between the second mating interface of the first connector and the first mating interface of the second connector.

The conductive interconnect may comprise at least two busbars comprising a first end and a second end. The second mating interface of the first connector and the first mating interface of the second connector may each comprise at least one slot. Connecting the conductive interconnect between the second mating interface of the first connector and the first mating interface of the second connector may comprise inserting first ends of the at least two busbars into the at least one slot of the second mating interface of the first connector and inserting second ends of the at least two busbars into the at least one slot of the first mating interface of the second connector.

In some embodiments, supplying power through a mating interface of the at least one mating interface of the first connector may comprise supplying power from power supply unit comprising a card edge inserted into the first mating interface of the first connector. In some embodiments, supplying power may comprise supplying between 60 Amps and 100 Amps, and in other embodiments supplying between 160 Amps and 240 Amps.

Features described herein may be used, separately or together in any combination, in any of the embodiments discussed herein.

BRIEF DESCRIPTION OF DRAWINGS

Various aspects and embodiments of the present technology disclosed herein are described below with reference to the accompanying figures. It should be appreciated that the figures are not necessarily drawn to scale. Items appearing in multiple figures may be indicated by the same reference numeral. For the purposes of clarity, not every component may be labeled in every figure.

DETAILED DESCRIPTION

Figure 1:
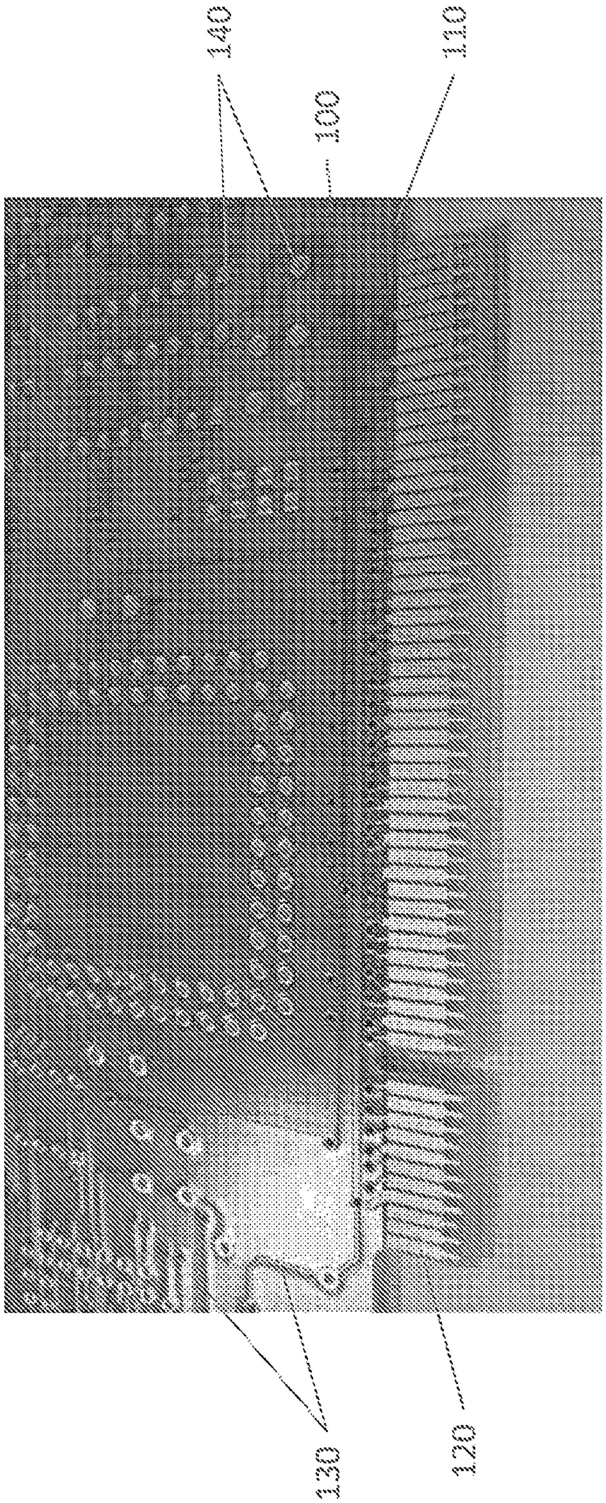
FIG. 1 is a perspective view of a portion of a printed circuit board (PCB) configured to connect with an edge connector.

The inventors have recognized and appreciated architectures for high speed, high performance electronic assemblies with low life-cycle costs. The assemblies may be implemented with a printed circuit board (PCB) with a first connector with at least two mating interfaces. One mating interface may be configured to connect to a power supply. The other mating interface may be configured to receive a conductive interconnect, such as a busbar, that can be routed over the PCB to a second connector. Without the conductive interconnect in place, power supplied through the first mating interface of the first connector may be distributed to components on the PCB through the power planes of the PCB.

With the conductive interconnect in place, a portion of the supplied current may flow through the interconnect to a location on the PCB remote from the first connector where the current may flow into the power planes of the printed circuit board. In this way, the current density in the vicinity of the first connector is decreased relative to a configuration in which the interconnect is not installed. Alternatively or additionally, the total current supplied to the PCB may be increased without increasing the current density in the vicinity of the first connector.

An increase in current may be desired, for example, during the life of an electronic assembly when additional or more powerful components are added to the PCB, which draw more power. These components may be added in the field or may be included in newly manufactured devices using PCB's designed prior to the upgrade. The capability to add the interconnect and increase the total current without increasing current density enables the PCB to be designed with a capability to carry less than the total amount of power that every copy of such a PCB might ever have to carry over its lifetime. Because increasing the current carrying capacity of a PCB conventionally entails adding more layers to the PCB, enabling a PCB to be designed for less than the total current it might carry, a PCB may be designed to be thinner and to have a lower manufacturing cost than a conventional PCB of the same capabilities.

In some embodiments, a connector that supports selective addition of a conductive interconnect may have a mounting interface and two mating interfaces, which may be orthogonal to each other. The mating interfaces and the mounting interface may be interconnected within the connector housing such that power supplied through one mating interface may be distributed to components on the PCB either through the mounting interface and then through the power planes of the PCB or through the second mating interface to a conductive interconnect and then to a second connector where the current may be coupled to the components attached to the PCB through the PCB.

In some embodiments, one of the mating interfaces of the connector may be a card edge connector, which may be configured to receive a card edge, or similarly sized structure, from a power supply. Another mating interface may similarly be configured like a card edge connector, but may receive, a busbar or similarly sized terminal of a power cable.

FIG. 1 shows a Printed Circuit Board ("PCB") 100 configured to be inserted into a card-edge connector. PCBs mechanically support and electrically connect one or more electronic components using conductive traces, pads, and other features etched from one or more conductive layers laminated onto layers of a non-conductive material. Traditionally, conductive layers are made from copper and non-conductive layers are made from woven fiberglass and flame resistant epoxy resin binders. PCBs are generally made with interspersed conductive layers of conductive traces that carry signals and layers that are largely continuous sheets. The largely continuous layers serve as grounds for the signal traces and can also carry power. They are sometimes called power planes.

Connections may be made to the conductive inner layers, whether those inner layers are signal layers or power planes, using holes 18 in the PCB. The holes may be plated and/or filled with conductive material such that they make connections between the surface of the PCB and the conductive structures at the inner layers. Components, not shown in FIG. 1, may be attached to the holes, such as by soldering. Pads on the surface of the PCB may likewise be attached to conductive structures at the inner layers of the PCB. Connections to the pads enable connections to the inner layers of the PCB.

In the PCB of FIG. 1, such pads serve as terminals 120, which may be coupled to an electrical connector such that PCB 100 may be connected to another PCB or other subassembly of an electronic system. In this example of FIG. 1, edge 110 of PCB 100 contains a plurality of terminals 120 configured for insertion into a card-edge connector. The terminals 120 may be signal or power terminals, depending on whether they are connected to signal layers or a power plane inside the PCB. Electrical signals and/or power transmitted or received from the terminals 120 are conducted throughout the PCB to individual components via traces 130 and vias 140.

Figure 2:
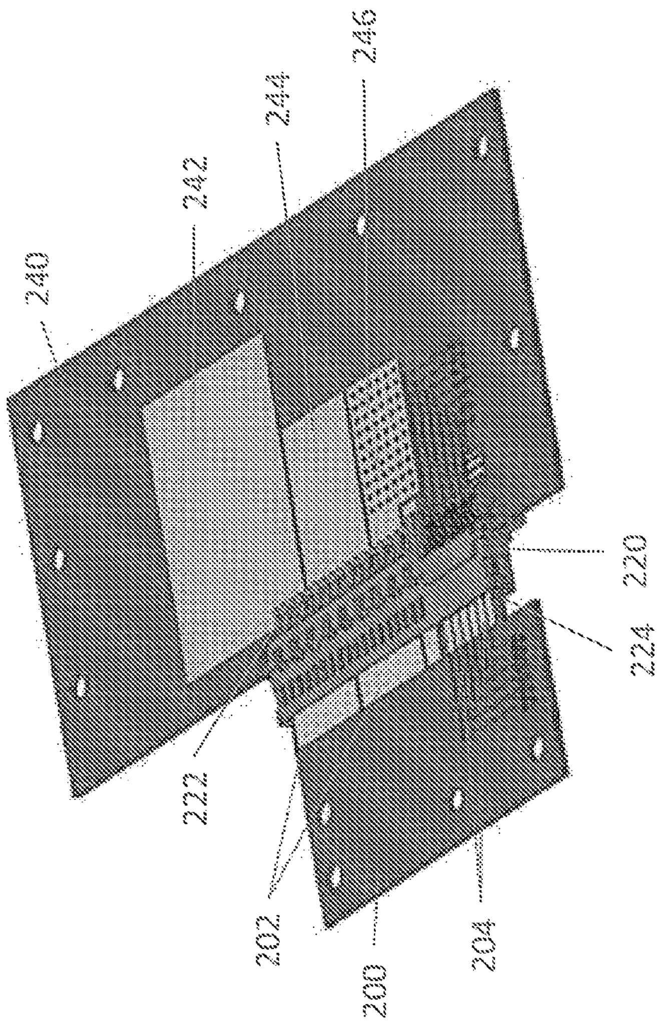
FIG. 2 is a simplified perspective view of two parallel boards connected through a straddle-mount card edge connector.

In the embodiment of FIG. 1, the terminals, whether for signal or power, have substantially the same width. In some embodiments, power terminals may be wider than signal terminals to increase the power carrying capacity of the card edge interconnection. FIG. 2 shows PCB 200 connected to PCB 240 via card-edge connector 220. In this embodiment, PCB 200 is illustrative of a portion of a power supply unit (PSU) configured for insertion in a card-edge connector via a parallel board (straddle-mount) arrangement. Other arrangements, such as vertically oriented or right-angle oriented connections are also possible. PCB 200 contains two conductive pads 202 configured to supply power and six conductive pads 204 configured to supply signal, although it should be understood that any number of each could be used in alternate embodiments.

The power pads 202 of PSU 200 may be on an edge suitable for a contact surface, which may be inserted into a slot 224 of a card-edge connector 220 containing power terminals 222. In some embodiments, the conductive pads 202 may comprise a high-conductivity material able to conduct electric current sufficient for applications requiring at least 3000 W of power, and having sufficient rigidity to withstand repeated mating and unmating with a connector. For example, conductive pads 202 may be surface portions of cladding, such as a layer of Cu that has a thickness of at least 0.14 mm, or at least 0.5 mm, or at least 1 mm, or at least 1.5 mm. The power supply may deliver relatively large currents, such as up to 60 A, 80 A, 100 A, 120 A, 180 A, 200 A or greater.

As illustrated in the example of FIG. 2, the power pads 202 may be wider than the signal pads 204. Such a design enables the power pads 202 to carry more current than the signal pads 204, without excessive heating. The larger cross-sectional area of the power pads 202 provide a lower contact resistance, a lower bulk resistance, and a lower current density, all of which contribute to less heating within the connector when a relatively large amount of current passes through the power pads 202.

Power terminals 222 in the card-edge connector may similarly be designed to pass larger amounts of power with an acceptable amount of heating. Current flow is often used as an indication of delivered power, because power and current are related, and heating is proportional to current flow. Acceptable heating may be expressed as temperature rise at a rated current. As a specific example, a connector, or a power terminal within the connector, may have a rated current capacity that reflects the amount of current that will increase the temperature from ambient conditions by a set amount, such as 30° C. For example, the heating in the connector may be below this threshold amount when a high current, such as 60 A, 80 A, 100 A, 120 A, 180 A, 200 A or greater in some embodiments is transmitted.

Card-edge connector 220 passes electrical signals and/or power between PCB 200 and PCB 240. To do so, card-edge connector 220 contains a slot 224 which receives PSU PCB 200. This slot can be uniform, if the card to be inserted has a consistent thickness along its insertion edge, or non-uniform if this thickness varies. Once inserted, power terminals 202 and signal terminals 204 come into contact with one or more conductive elements 222 that pass electrical signals and/or power through to PCB 240. These elements may be formed of a conductive materials and may be sufficiently robust to allow for the repeated insertion and removal of card edge like that on PCB 200. PCB 204 contains components, of which exemplary components 242, 244, 246 are numbered, which use, condition, or otherwise interact with the electronic signals and/or power transmitted across card-edge connector 220.

In some embodiments, the various functions of these components may require different and incompatible electronic signals and/or power. For example, component 242 may require 5V whereas component 244 may require 12V. As such, the designs of PCB 200, card-edge connector 220, and PCB 240 are constructed to provide discrete electronic pathways as required.

The inventors have recognized that in the card-edge connector embodiment shown in FIG. 2, the full amount of current that is transmitted to PCB 240 across card-edge connector 220 is distributed to the power planes of PCB 240, creating a high current density in the PCB 240 adjacent connector 220. As such, the amount of current that can be transmitted is limited by both the thickness of each power layer and the number of power layers in the region of PCB 240 adjacent connector 220. Making thicker layers may undesirably increase the size cost and/or manufacturing complexity of the electronic assembly. Adding additional layers may increase the amount of power that can be transmitted to PCB 240, however this adds cost, weight, and thickness to an electronic assembly made with the PCB. The number of layers required to supply large currents (e.g., 60-100 Amps, 180-260 Amps, etc.) may therefore be undesirable. In scenarios in which a PCB is designed for possible upgrades that will draw high currents, initial construction with enough power planes to support future high currents may similarly be undesirable.

In some embodiments described herein, a PCB may be designed with fewer power planes than are necessary to carry a designed maximum current. One or more connectors may be mounted to the PCB. When more power than can be carried by the power planes is desired, such a connector may be connected to a conductive interconnect, such as a busbar, that may distribute power to locations on the PCB remote from the one or more connectors. The conductive interconnect may extend in a direction parallel to the PCB.

The one or more connectors may have multiple interfaces, including a first mating interface, which may be configured as a mating interface of a conventional card edge connector. Current may be supplied to the connector through the first mating interface and then distributed through other interfaces of the connector to the PCB directly or to the conductive interconnect, which may pass over the PCB. Splitting the current within the connector reduces the current density in the PCB adjacent the connector.

Figure 3:
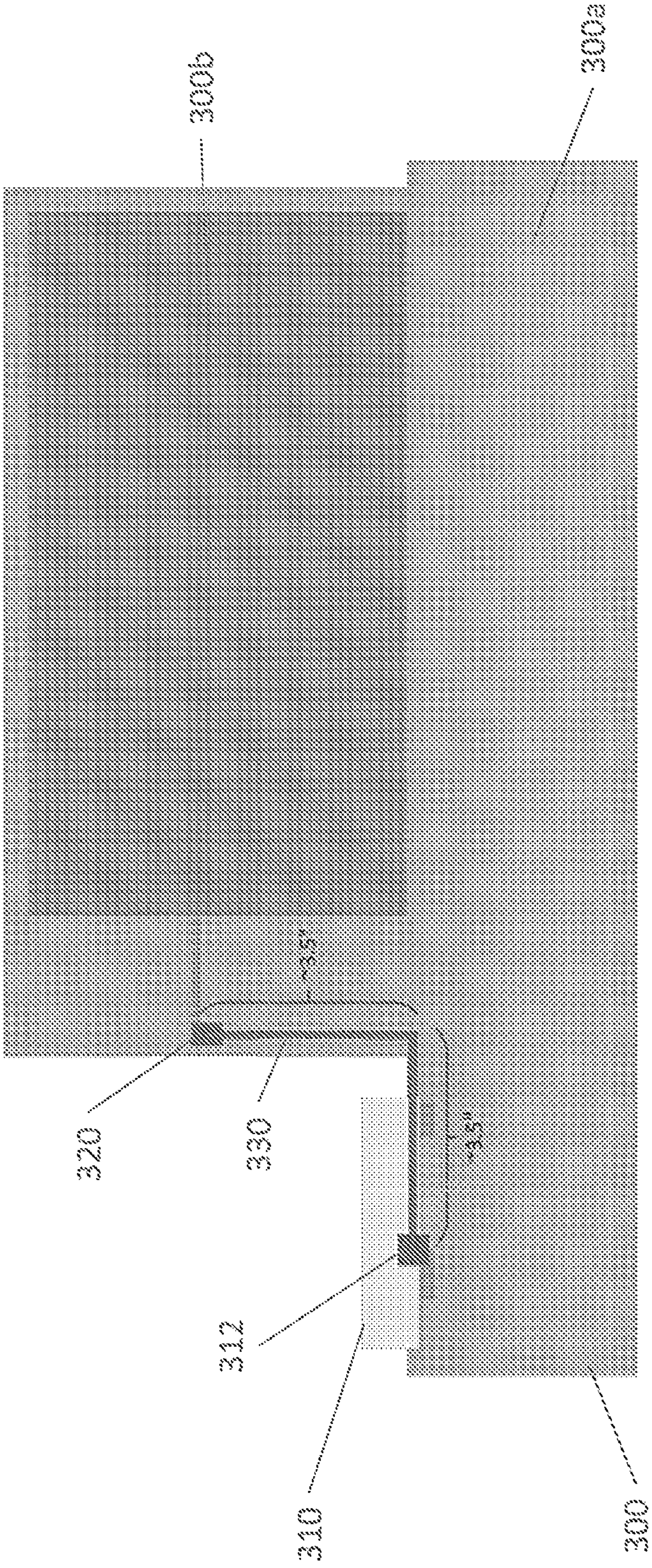
FIG. 3 is a schematic view illustrating distribution of power supplied through a card-edge connector in part through a conductive interconnect, such as a busbar, and in part through power planes in a PCB.

FIG. 3 is a schematic illustration of a PCB 300 with such a card-edge connector 310. In this example, connector 310 may be configured to receive a PSU (not illustrated in FIG. 3). Card-edge connector 310 contains an additional mating interface 312 which is configured to receive a conductive interconnect, which in this example is a busbar 330.

Busbar 330 may be implemented as a metallic strip, such as a metal bar. The busbar may be insulated or uninsulated and may have sufficient thickness to be unsupported or, in some embodiments the busbar may be supported in air by insulated pillars. These features enable the busbar to be air cooled. In some embodiments, the bus bar is bent at a right angle, forming two legs, with each of its two legs between 2" and 24" long, and in some embodiments between 3" to 10", such as 3.5" in some embodiments. A busbar may be configured to carry power at a single voltage or may be configured to carry power of multiple voltage levels. In embodiments in which the busbar is configured to carry power at multiple voltage levels, the busbar may contain multiple, electrically insulated metal strips.

A first end of busbar 330 may be inserted into mating interface 312. Mating interface 312 may be configured as a card-edge connector with a slot of sufficient width to receive the busbar 330. A second end of busbar 330 may be coupled to the power planes of PCB 300 at a location remote from connector 310. In the illustrated example, busbar 330 is inserted into a second connector 320 to provide coupling to PCB 300. Connector 320 may similarly have a mating interface configured to receive the busbar 330. As power is supplied via card-edge connector 310, a first portion of the power may pass through the mounting interface of connector 310 to PCB 300 in the vicinity of connector 310. A second portion of the power may be transmitted to PCB 300 via busbar 330 and connector 320. Once coupled to the PCB, the power may be distributed to components attached to the PCB through power planes in the PCB.

In the example of FIG. 3, the first portion of the power is delivered to section 300*a* of PCB 300 and the second portion of the power is delivered to section 300*b* of PCB 300. In the schematic shown in FIG. 3, section 300*a* and section 300*b* are on the same PCB, but are not electronically connected. However, it is not necessary that the sections 300*a* and 300*b* be electrically decoupled. In some embodiments, PCB 300 may be implemented as a conventional PCB with power planes that extend substantially continuously throughout the PCB. Even in such a configuration, current flow may split based on the power draw of components and electrical properties of PCB 300. Thus, even if the sections are not physically separate, the power flow throughout each of the sections 300*a* and 300*b* is less than the total supplied power, resulting in lower maximum power density in the PCB than without busbar 330.

While this embodiment shows a single busbar 330 and traces from each connector 310 and 320 to respective sections of the PCB, it should be appreciated that FIG. 3 is a schematic illustration of the current splitting. FIG. 3 is provided to schematically illustrate lower maximum current density, with lower maximum heat generation per unit area of the PCB, that enables the assembly formed with PCB 300 to operate at a higher power level than without busbar 330.

Figure 4A:
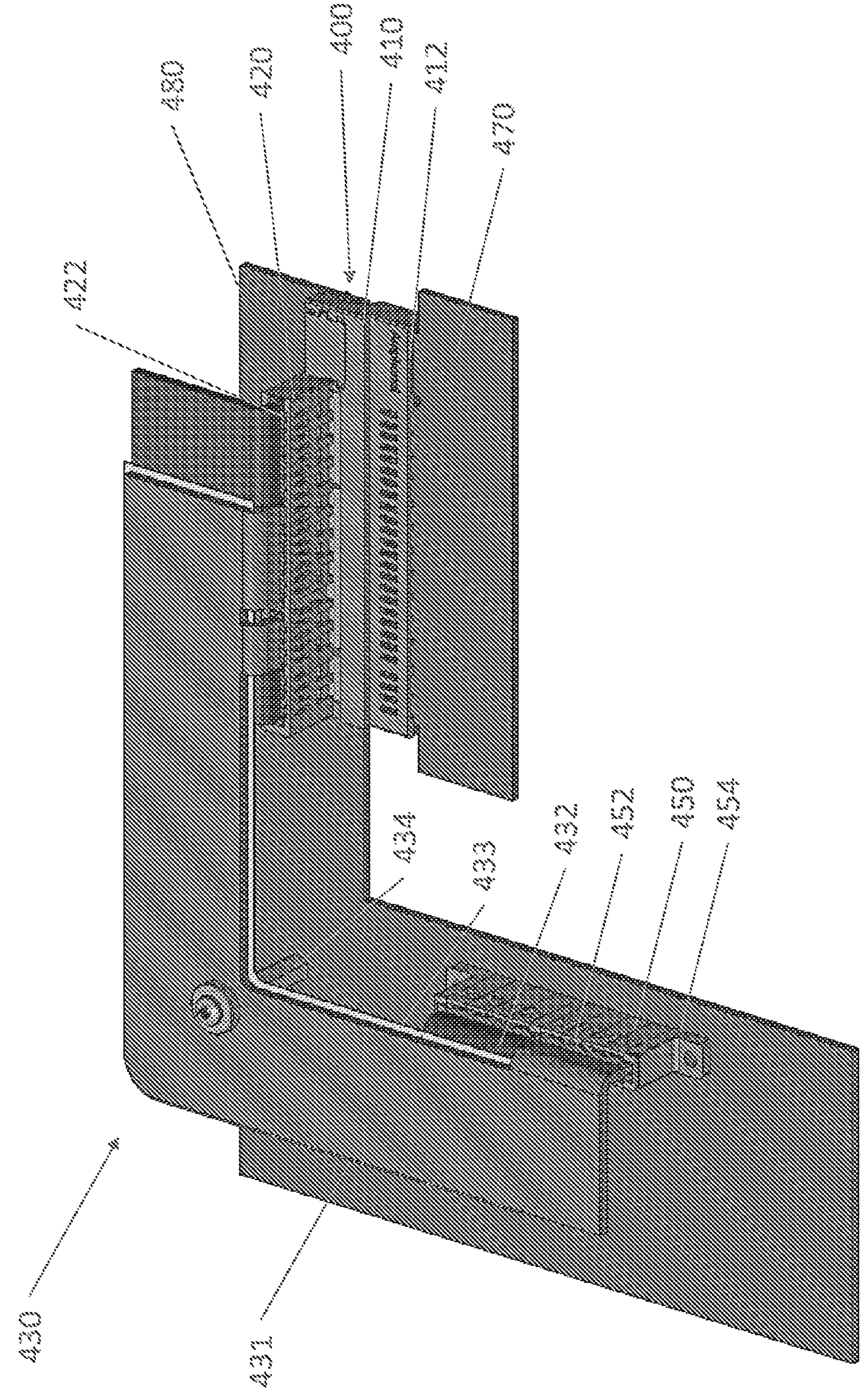
FIG. 4A is a perspective view of an exemplary embodiment of a portion of an electronic device with card-edge connector mounted to a PCB with busbars connected to distribute power to components on the PCB.
Figure 4B:
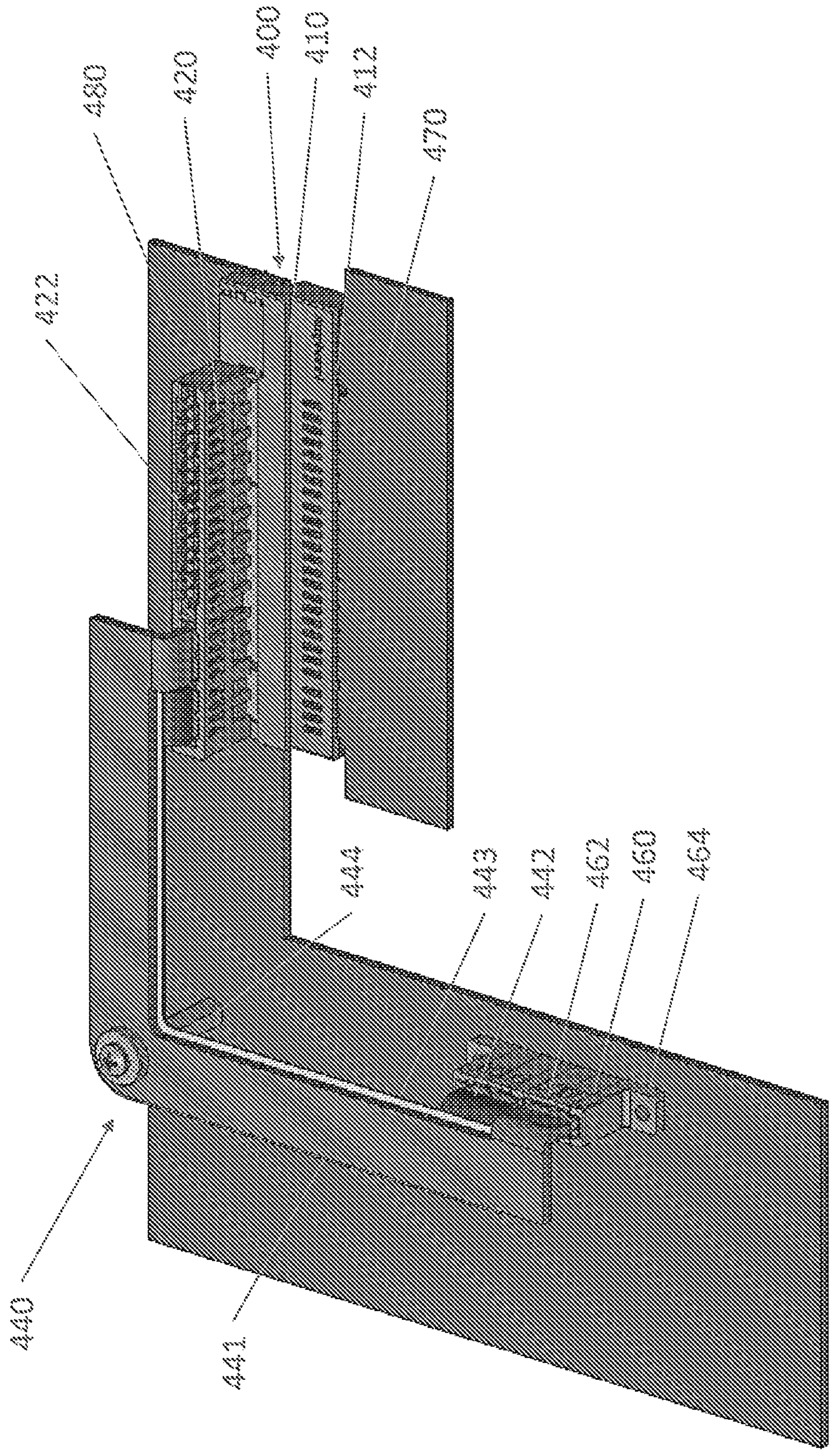
FIG. 4B is a perspective view of a portion of an alternate embodiment of an electronic device with card-edge connector mounted to a PCB with busbars connected to distribute power to components on the PCB.

FIGS. 4A-B show two possible configurations of the busbar connector schematically shown in FIG. 3. In both figures, the PCB and card-edge connection arrangement remains the same, although in alternate embodiments they may be different. In both figures, a source of power, here illustrated as PSU 470, is inserted into slot 412, forming a first horizontal mating interface 410 of L-shaped card-edge connector 400. Electrical signals and a first portion of the supplied current is coupled to PCB 480 through L-shaped card-edge connector 400, which may have a board mounting interface as in a conventional connector.

In addition, a portion of the supplied current may pass through a second vertical mating interface 420 of connector 400. In this example, vertical mating interface 420 includes a second slot 422 into which a busbar 430, in the case of FIG. 4A, or busbar 440, in the case of FIG. 4B, is inserted. A second portion of the supplied current may be carried to connector 450, which includes a third mating interface 452 and second mounting interface 454, via busbar 430 in FIG. 4A or connector 460, which includes a third mating interface 462 and second mounting interface 464, via busbar 440 in FIG. 4B. From the remote connector, the second portion of the current may pass into PCB 480 adjacent connector 450 or 460, enabling that second portion to be distributed to components mounted to PCB 480, without increasing the current density adjacent connector 400.

In the illustrated embodiment, busbars 430 and 440 are configured with two electrically separate paths. To support this function, busbar 430 contains a first portion 431 and a second portion 432 in FIG. 4A, and busbar 440 contains a first portion 441 and a second portion 442 in FIG. 4B. In both figures, these portions may be separated by sheets of insulation, 433 in FIG. 4A and 443 in FIG. 4B. These first and second portions may be configured to transmit electric power of different characteristics, such as different polarities to provide a supply and a return, different voltages, or different frequencies. In other embodiments, the portions of the busbar may be electrically coupled and may transmit electric power of identical characteristics with higher current carrying capacity than one portion alone.

In some embodiments, an insulative support, an example of which is post 434 in FIG. 4A and 444 in FIG. 4B, may provide additional structural support to busbars 430 and 440. In this example, the posts hold busbars 430 and 440 parallel to PCB 480. In this example, busbars 430 and 440 bend at an approximately 90 degree angle, and the posts provide support at the bends.

Busbar 440 in FIG. 4B is configured with different dimensions than busbar 430 in FIG. 4A. Busbar 440 has a reduced cross-sectional area relative to busbar 430. Busbar 440 may be used, for example, in applications with lower power requirements than those of busbar 430. For example, busbar 430 could be configured to carry a maximum current between 180-260 Amps, such as 220 Amps, whereas busbar 440 could be configured to carry a maximum current between 60-100 Amps, such as 80 Amps. The reduced cross section of busbar 440 also means that it contacts fewer of the terminals within the second mating interface 420 of connector 400.

System configurations as shown in FIGS. 4A and 4B may result from using a PCB 480 to which a connector 400 is attached. Connector 400 has a mating interface that may mate with a PSU or other component through which current may be supplied. Connector 400 also includes a mounting interface in which terminals inside the connector are connected to PCB 480, coupling current received through the mating interface into the power planes within PCB 480. In some embodiments, there may be a sufficient number of power planes in PCB 480 for current to pass through the mounting interface of connector 400 without exceeding the current rating at any portion of PCB 480.

In such a configuration, no conductive interconnect may be inserted into the second mating interface 420 of connector 400. In such a configuration, a second connector, such as connectors 450 and 460 may be present, but not connected to connector 400 through a conductive interconnect separate from PCB 480. Alternatively or additionally, the second connector may be omitted.

Nonetheless, PCB 480 may be manufactured with a footprint for a second connector, which may be used to mount a second connector when the power draw of all the components mounted on PCB 480 will cause the current density in the vicinity of connector 400 to exceed the current carrying capacity of the power planes within PCB 480. In that scenario, a second connector, such as connector 450 or 460, may be mounted in the footprint and connected to connector 400 through a conductive interconnect capable of carrying a portion of the supplied current from connector 400 to the second connector without passing through PCB 480.

The configuration of the second connector, and of the conductive interconnect joining the first and second connectors, may depend on the amount by which the current required for operation of the components on PCB 480 exceeds the current carrying capacity of the power planes in the vicinity of connector 400. The second connector may be sized to receive a wider busbar, for example, when the required current exceeds the current capacity by a larger amount. As specific examples, PCB 480 may be designed with 18 or fewer layers, but may nonetheless carry up to 60 Amps. If the required current is between 60 and 100 Amps, a busbar as shown in FIG. 4B may be added to carry an additional 40 Amps. If a current between 100 and 200 Amps is required, a busbar as shown in FIG. 4A may be added to carry up to an addition 140 Amps, for example.

In this example, a connector mounted to PCB 480 may be configured based on the amount of current to be diverted from the first connector to the second connector. Alternatively or additionally, the conductive interconnect between connectors may be configured based on the amount of current to be diverted. As illustrated in FIG. 4B in connection with the second mating interface on connector 400, a bus bar may be inserted into only a portion of a slot that forms the mating interface. Using this technique, a larger connector suitable for diverting a relatively large amount of current, such as connector 450, may be mounted to PCB 480. If a system is configured such that less than the full amount of this large current needs to be diverted, a smaller busbar may be used and a portion of the mating interface of the larger connector 450 may be unoccupied.

Figure 5:
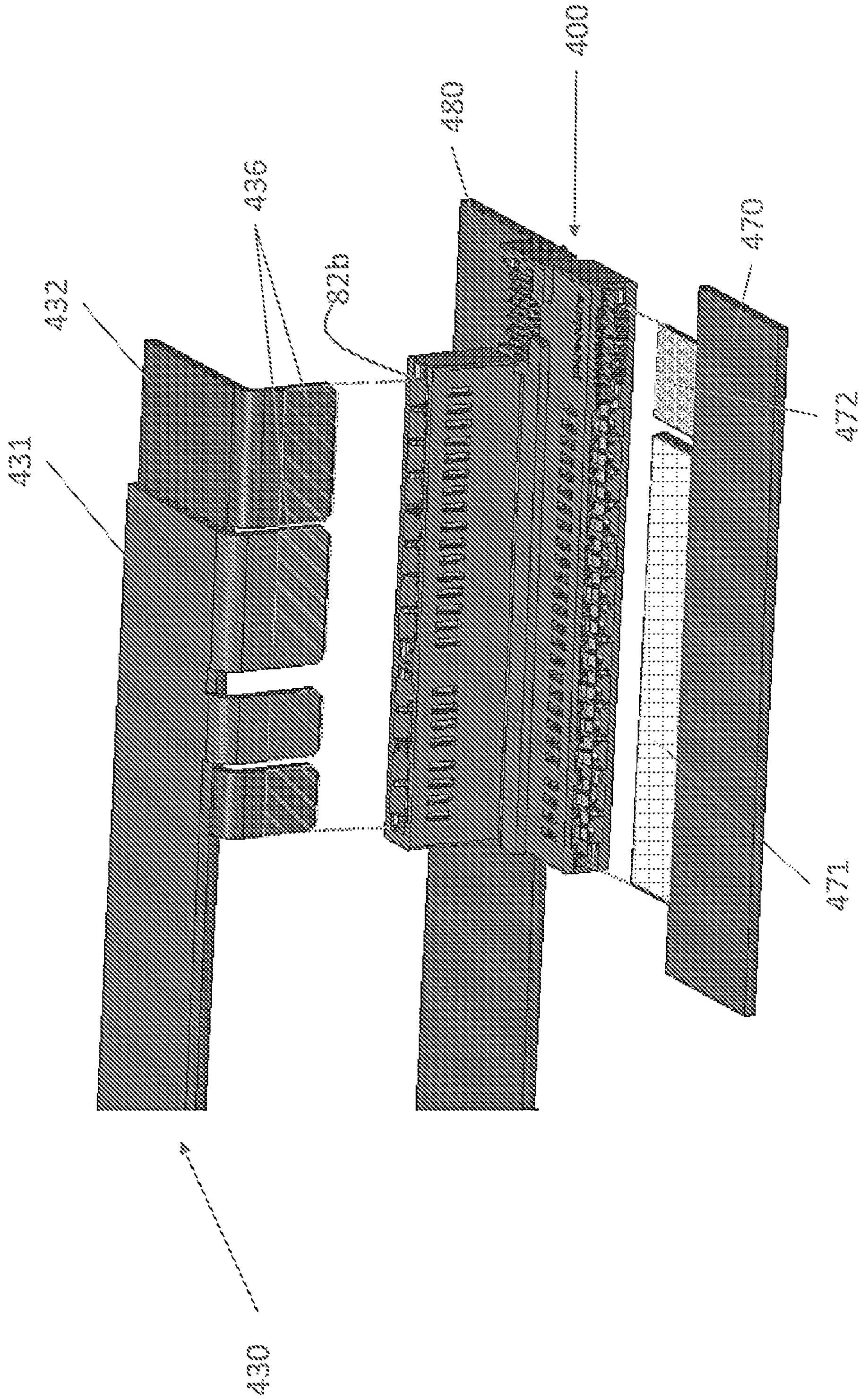
FIG. 5 is a perspective, partially exploded view of a portion the electronic device of FIG. 4A, including a connector mounted to a PCB and mated to a card edge of a power supply unit and a busbar.

FIG. 5 shows the connector from FIG. 4A with busbar & PSU disconnected. A plurality of conductive elements (e.g. 800, FIGS. 8A-8B) within L-shaped card edge connector 400 are configured to electrically connect portions of at least three non-coplanar surfaces. In the embodiment shown in FIG. 5, those surfaces are:

The power terminals 436 of busbars 431 and 432;

The power terminals 471 and signal terminals 472 of PSU 470; and

PCB 480.

Figure 6:
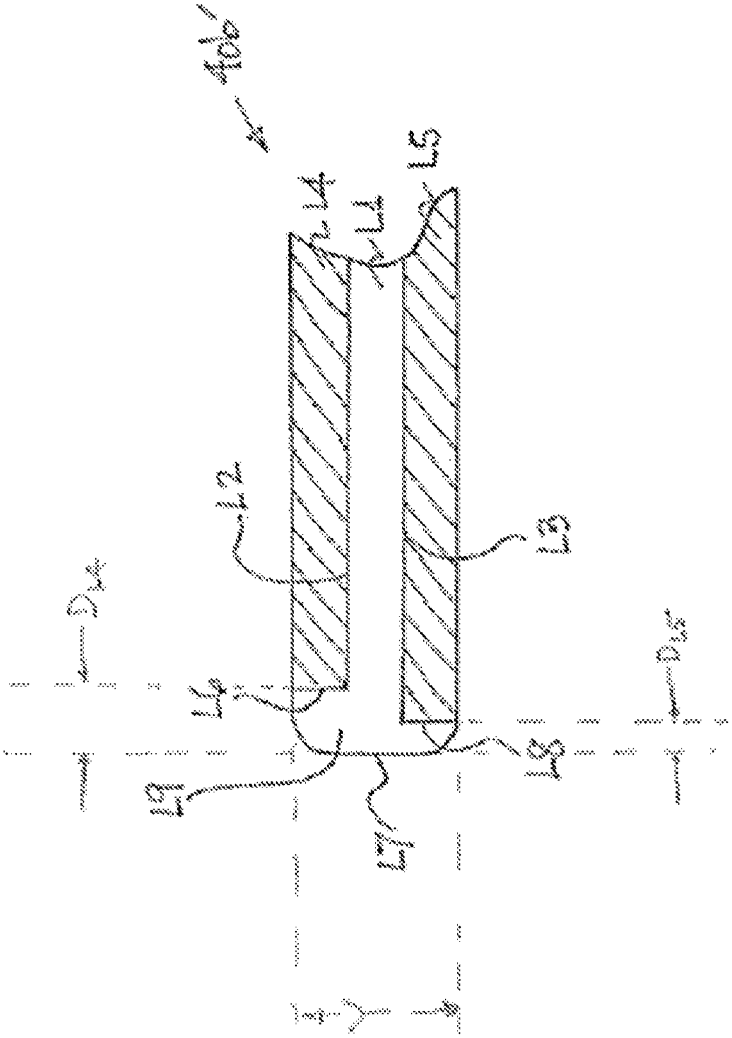
FIG. 6 is a cross sectional view of an exemplary busbar.

In the embodiment of FIG. 5, busbar 430 includes two electrically separate portions, 431 and 432, stacked one above the other. Each of the portions may have terminal portions forming power terminals 436. FIG. 6 shows an exemplary cross section of an embodiment of a busbar. In this embodiment, the busbar is a laminated assembly 40*b*' comprised of an insulative layer L1 having first and second surfaces L2, L3, a first blade L4 arranged on the first surface L2, and a second blade L5 arranged on the second surface L3. The first and second surfaces L2 and L3 may be parallel to the segment of busbar vertically inserted into a slot forming a mating interface on L-shaped card-edge connector 40. The first blade L4 may have a first insertion edge L6 that is set back from an insertion edge L7 of the laminated assembly 40*b*' by a first distance DL4, and the second blade L5 may haves a second insertion edge L8 that is set back from the insertion edge L7 of the laminated assembly 40*b*' by a second distance DL5 that may be different from the first distance DL4. The first distance DL4 may be in a range of 1 mm to 8 mm. The second distance DL5 may be in a range of 1 mm to 6 mm. As a specific example, the difference in set-back may be on the order of 2 mm to 5 mm. Such a configuration may be used, for example, in a busbar in which one of the blades L4 and L5 is connected to a supply line of a circuit of the power supply and the other of the blades L4 and L5 is connected to a return line for that circuit. Such a configuration enables advance mating of the supply or return line when the laminated assembly 40*b*' is inserted into a slot of a connector, by using the second blade L5 for that portion of the circuit to mate first.

The insulative layer L1 may comprise a rigid plastic layer, which may include an endcap L9 that extends over the first and second insertion edges L6, L8 of the first and second blades L4, L5. Alternatively, the insulative layer L1 may comprise an insulative film. For example, the insulative film may have a thickness of about 0.1 mm and the conductive blades L4, L5 may be copper sheets having a thickness of about 1 mm.

Assembly 40*b*', in this embodiment, may extend from a recessed portion of an insulative housing of the power busbar. The first conductive blade L4 may be a current-in blade that may provide 3000 Watts of power at 48 V, and the second conductive blade L5 may be a current-out blade.

The laminated assembly 40*b*' may have a total thickness Y in a range of 1 mm to 6.5 mm. A thickness of each of the first and second conductive blades L4, L5 may be in a range of 0.5 mm to 3.5 mm.

While shown in this embodiment as a laminated assembly 40*b*', it should be understood that the busbar could be a laminate comprised of additional layers or a single solid member. Further, though FIG. 6 is described as representing a busbar that connects a first connector and a second connector, a structure as shown in FIG. 6 may be a portion of a power supply, and may be inserted into a first mating interface of connector 400.

Figure 7B:
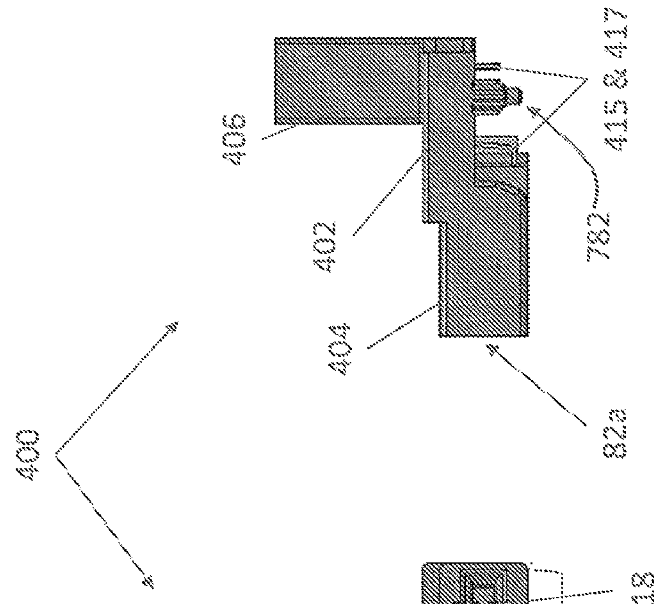
FIGS. 7A and 7B are a front view of the card-receiving face and right side view, respectively, of an exemplary embodiment of a card-edge connector configured for bus bar input.
Figure 7A:
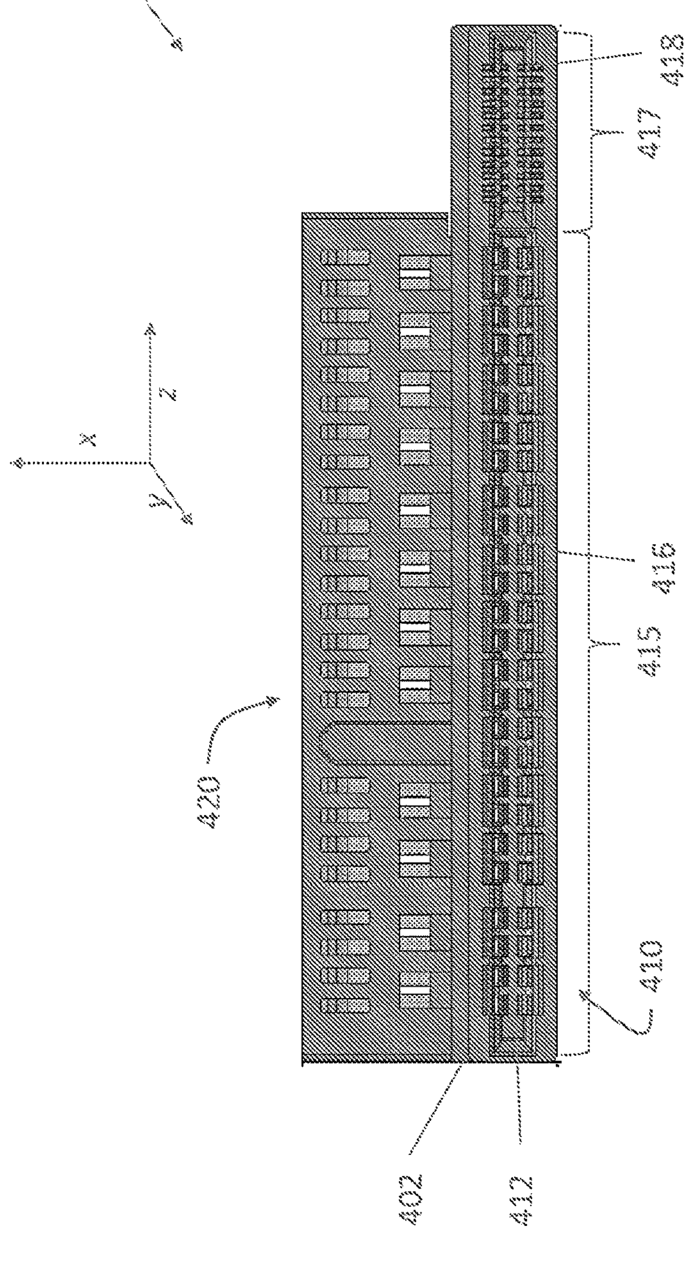

FIGS. 7A and 7B show front and side views, respectively, of L-shaped card-edge connector 400. Connector 400 has an L-shaped housing 402. Housing 402 could be formed of a rigid, insulative material capable of withstanding the high heat generated by the transfer of high voltage electricity. Housing 402, for example, may be molded from high temperature plastic with fiberglass fillers.

L-shaped housing 402 provides a first mating interface 410 and a second mating interface 420 and a mounting interface 782. In the example of FIGS. 7A and 7B, housing 402 has a horizontal section 404, which will be parallel to a surface of a printed circuit board to which connector 400 is attached. The first mating interface 410 is formed in the horizontal section. Housing 402 also has a vertical section 406. The second mating interface 420 is formed in the vertical section.

In the embodiment illustrated, mounting interface 782 is formed at the intersection of the horizontal and vertical sections. The illustrated configuration supports parallel board connections between a PCB to which connector 400 is attached and a board inserted into the first mating interface 410, such as is illustrated in FIGS. 4A and 4B. However, other relative positions of the mating and mounting interfaces are possible to support other system configurations.

In some embodiments, the horizontal and vertical sections could be of the same length. In other embodiments, such as the embodiment shown in FIGS. 7A and 7B, these sections could be of different length. In the illustrated embodiment, the first mating interface 410 has a power portion 415 and a signal portion 416. In this example, the second mating interface supports only power connections and is approximately the same length as the power portion 415 of the mating interface. In some configurations, however, only a portion of the power supplied through the first mating interface is delivered to components of the PCB to which connector 400 is attached and the second mating interface may be shorter than even the power portion 415 of the first mating interface 410.

Both mating interfaces 410 and 420 are configured, in this embodiment, as card edge connectors. The housing 402 comprises a first slot 412, forming a portion of the first mating interface 410 and a second slot 422 (FIG. 5) forming a portion of the second mating interface 420. In this embodiment shown, slots 412 and 422 are offset by an angle of 90 degrees, resulting in an L-shape, but it should be understood that other angular offsets are possible to support different system configurations. In this embodiment, the housing 402 is configured to receive a PCB configured for edge connection (e.g., a PSU) in the first slot 412 and a conductive interconnect, such as a busbar, in the second slot 422.

Located within housing 402 are two pluralities of conductive elements. The first plurality of conductive elements 416 transmit electric power and the second plurality of conductive elements transmit electric signal 418. In the embodiment illustrated, the power conductive elements are configured to make power connections between the first mating interface 410, second mating interface 420 and mounting interface 782. The signal conductive elements may be shaped as in a conventional connector or otherwise to provide connections. Tails of conductive elements 415 and 417 are exposed at mounting interface 782 where they can be attached to a printed circuit board. In the example of FIG. 7B, the tails protrude from the underside of card-edge connector 400. The tails are configured to electrically connect a card-edge connector 400 to a PCB for the purposes of transmitting electrical power and signal. The tails may be shaped for attachment to a PCB via soldering, press fitting, or any other attachment technique. In some embodiments, different tail configurations may be used for signal and power connections. Power connections, for example, may be made through post in hole soldering and signal connections may be made through surface mount soldering or may be press fit.

Figure 8B:
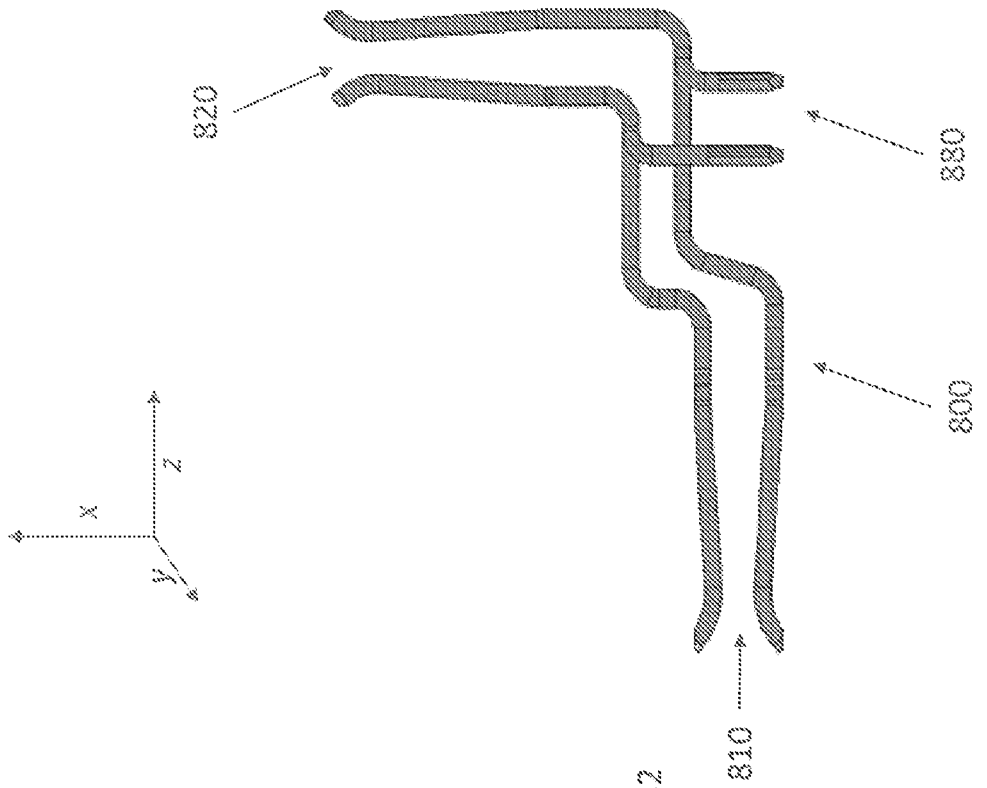
FIGS. 8A and 8B are a perspective and a right side view, respectively, of an exemplary embodiment of the conductive elements within a card-edge connector.
Figure 8A:
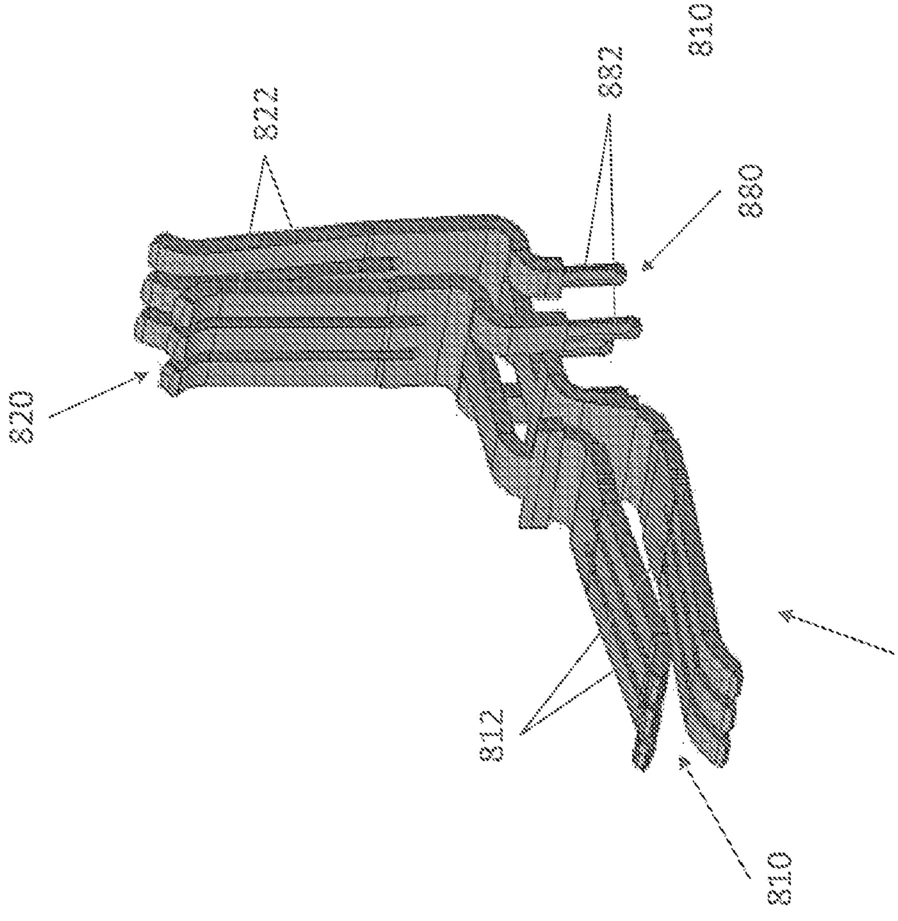

FIGS. 8A and 8B show a perspective and side view of an embodiment of the power conductive elements 415 that may be located within L-shaped card-edge connector 400. In some embodiments, the set of power conductive elements 415 may be configured to carry a large amount of current, for example a maximum current between 60 Amps and 260 Amps. Each of the power conductive elements 800 and may be formed of one or more members that collectively provide, for each, portions to provide multiple interfaces. Those members, for example, may each be stamped from a sheet of metal and then formed to provide mating and mounting interfaces. In this example, each of the power conductive elements has a first mating contact portion 810 and a second mating contact portion 820 positioned to form a portion of each of two mating interfaces, 410 and 420, and tails 880, positioned to form a mounting interface 782.

In the illustrated embodiment, the mating contact portions are formed as contact surfaces on spring fingers. Each of the power conductive elements 800 may have a first set of spaced-apart fingers 812 extending horizontally and a second set of spaced-apart fingers 822 extending vertically. Each of the power conductive elements 800 may have a set of tails 882 descending vertically. As such, the first and second sets of fingers, 812 and 822, may be offset from each other by 90 degrees and the second and set of fingers and tails, 822 and 882, may be offset from each other by 180 degrees.

In the illustrated embodiment, each of the mating interfaces is shown with three spring fingers of similar dimensions. In other embodiments, the number of spring fingers for some or all of the mating interfaces may be more or less than three. Moreover, in some embodiments, different mating interfaces may have different numbers of spring fingers. Moreover, some or all of the spring fingers may have different dimensions than others. Alternatively or additionally, some or all of the mating and/or mounting interfaces may be shaped differently than as illustrated.

Figure 9B:
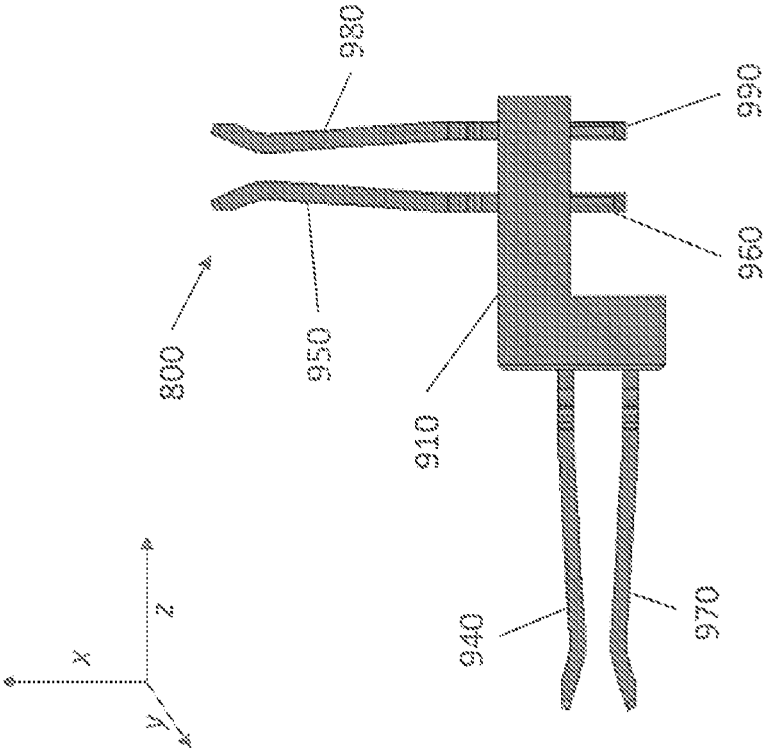
FIGS. 9A and 9B are a perspective and right side view, respectively, of an exemplary embodiment of the conductive elements within a card-edge connector.
Figure 9A:
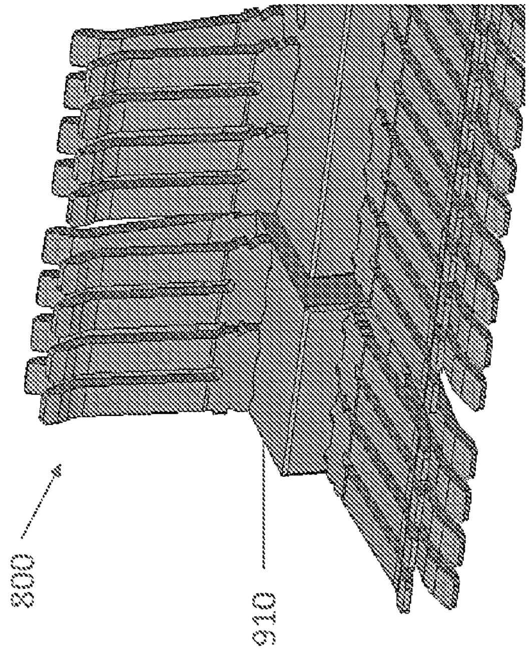

In the illustrated embodiment, power conductive elements are held together in subassemblies that are inserted into the connector housing. The power conductive elements may be held together, for example, by subassembly housings 910 in FIGS. 9A and 9B, which may be plastic molded around intermediated portions of the conductive elements 800, leaving the mating and mounting portions of the conductive elements exposed. Some or all of the power conductive elements may be held in the same housing and there may be one or more subassemblies in a connector. The subassemblies may be inserted into a housing, such as housing 402, to form a connector.

In some embodiments, the power conductive elements maybe positioned in pairs. Fingers on one conductive element of a pair may have contact surfaces facing the contact surfaces of the other conductive element of the pair. In the embodiment illustrated in FIGS. 9A and 9B, both conductive elements of the pairs are held in the same housing 910, which establishes a desired spacing between the mating contact surfaces of the conductive element of the pair.

The conductive elements may be positioned such that the contact surfaces of the pairs line opposite sides of a slot that forms a mating interface to receive either an edge of a PCB or a conductive interconnect, such as a busbar. For example, spring fingers 940 and 970 are spring fingers on respective power conductive elements of a pair that have opposing contact surfaces. Likewise, spring fingers 950 and 980 have opposing contact surfaces. In both instances, the spring fingers may bend towards each other such that a spring force is generated against a component, such as a PCB or bus bar, inserted in the slot between them.

In this example, spring finger 940 and 950 may be integrally formed from a sheet of metal from which a power conductive element was stamped. Similarly, spring fingers 970 and 980 may be integrally formed from a sheet of metal from which a power conductive element was stamped. Each such sheet of metal may be stamped with multiple fingers. Additionally, each such sheet may be stamped with tails, such as tails 960 and 990. Tails 960, for example, may be stamped of the same sheet as spring fingers 940 and 950 and tails 990 may be stamped from the same sheet as spring fingers 970 and 980. As such, in some embodiments, spring fingers and tail, 940, 950, and 960 may be electrically connected. Likewise, in some embodiments, spring fingers and tail 970, 980, and 990 may be electrically connected.

Figure 10A:
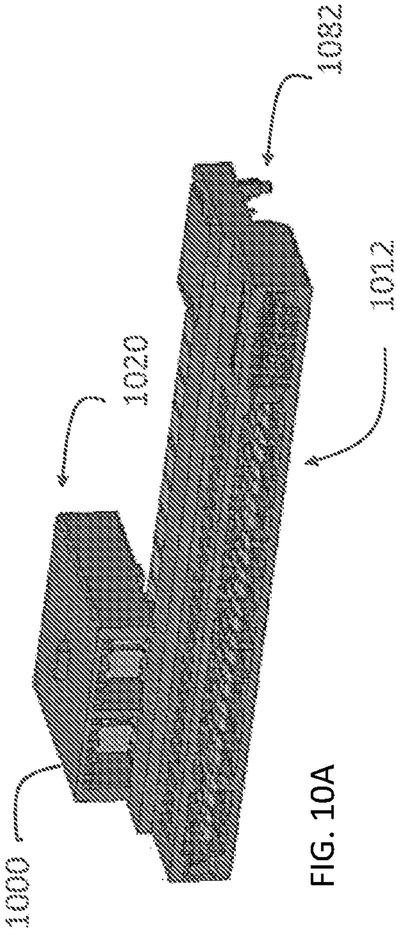
FIGS. 10A, 10B and 10C are a perspective, from and right side view, respectively, of an alternative embodiment of a connector.
Figure 10B:
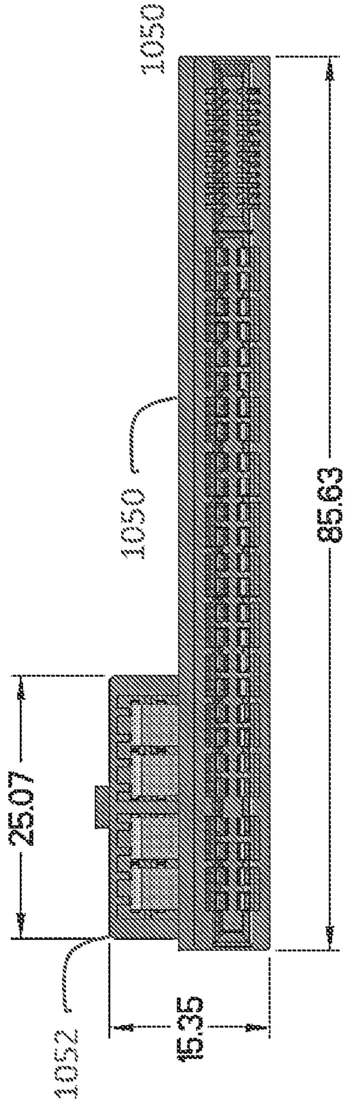
Figure 10C:
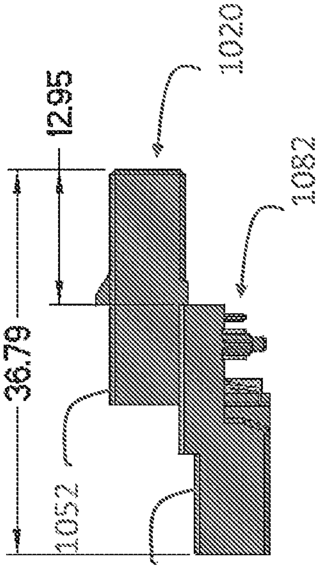

FIGS. 10A, 10B and 10C illustrate an exemplary embodiment of a connector configured for use in a system in which a first portion of the power supplied through a connector may be delivered to a PCB through a mounting interface of the connector and a second portion may be delivered to a remote location on the PCB through a conductive interconnect. The connector 1000 is here shown with a first mating interface 1012 and a mounting interface 1082, which may be configured as with the first mating interfaces and mounting interfaces as described above. First mating interface 1012 may be formed, for example, by a slot in housing portion 1050 lined with spring fingers of conductive elements. Mounting interface 1082 may be formed with tails of those conductive elements extending from housing portion 1050.

A second mating interface 1020 may also be provided for mating with a conductive interconnect that distributes a portion of the power supplied through first mating interface 1012 to a remote location of the PCB to which connector 1000 is mounted. Second mating interface 1020 may be formed, as described above in connection with second mating interface 420, with a slot in a housing portion 1052. The slot may be lined with one or more rows of contact portions of conductive elements. Those conductive elements may be integral with the contact portions of the conductive elements forming first mating interface 1012.

In contrast to second mating interface 420 in which the slot has a vertical orientation, the slot of second mating interface has a horizontal orientation. Accordingly, a conductive interconnect, such as a busbar or cable assembly, is inserted into the second mating interface 1020 in a horizontal direction. The conductive elements are formed to position contact portions to line this horizontal slot.

Further, the housing connector 1000 is shaped to provide two slots with this orientation. In the illustrated embodiment, housing portions 1050 and 1052 are both elongated in a horizontal direction. The housing portions are illustrated elongated in offset planes, but embodiments with other vertical separation between the elongated portions, and therefore the first and second mating interface, may be constructed.

Dimensions (in millimeters) are noted in FIGS. 10B and 10C. Those dimensions are illustrative rather than limiting. Other embodiments may have any one or more dimensions differing from the stated dimensions by 10%, 20%, 50% or more.

Having thus described several embodiments, it is to be appreciated various alterations, modifications, and improvements may readily occur to those skilled in the art. Such alterations, modifications, and improvements are intended to be within the spirit and scope of the invention. Accordingly, the foregoing description and drawings are by way of example only.

Various changes may be made to the illustrative structures shown and described herein. As an example of a possible variation, embodiments of an electronic system were described in which a printed circuit board 300 was designed to mate with a power supply unit through connector 310. In such a configuration, electrical power may be sourced from the power supply unit and used by components on printed circuit board 300. However, it should be appreciated that the techniques described herein are applicable to systems in which power flows in either direction through connector 310 and the techniques are useful with systems to couple power in any direction.

As another example of a variation, the power portion 471 of a PCB may comprise a blade of conductive material. For example, the power portion 471 may comprise any of the following: a solid piece of elemental metal having high conductivity (e.g., Cu, Al); a solid piece of an alloy of metals (e.g., a Cu alloy); or a solid plate or core clad with a high-conductivity metal (e.g., a Cu plate clad with Au, a steel plate clad with Cu, a resin plate clad with Cu); or a laminate with layers of high conductivity material interspersed with lower conductivity materials.

Alternative construction techniques for bus bars may also be used. The busbar may be, for example: a solid piece of copper; a core that is clad with a thick layer of copper; a core that is clad with a thick layer of copper and a surface layer of gold; a core that is clad with a thick layer of copper, a layer of silver, and a surface layer of gold; a laminated structure with a thin insulative layer separating two thicker conductive layers; etc. As will be appreciated, the high-conductivity material may be a metal alloy. The core may be made of any material having properties that enable it to be formed into a blade-like shape and that may be clad with another material without adversely reacting with the other (cladding) material. For example, the core may be made of aluminum.

Moreover, a busbar with two portions supporting two electrically separate paths was illustrated to provide an exemplary busbar. Such a busbar may be used, for example, in an electronic device with one high current power circuit. Some electronic devices may have more than one high current power circuit, and may therefore have a busbar with more than two portions, such as 4, 6 or more portions. Each portion of the bus bar may have a mating portion, such as an exposed surface that may be inserted into a card edge connector as pictured above.

Further, it is not a requirement that the conductive interconnect be a busbar. In some embodiments, one or more cables may form a conductive interconnect. The number of cables may depend on the number of high current circuits in the electronic device. Each cable may be terminated with a mating portion, which may be a separate element, such as a tab terminal, or may be formed by fusing strands of the conductors of the cable into a tab. Such a configuration may be used in connection with a card edge connector. Mating portions that have spring fingers or other structures may be used in some embodiments when the conductive interconnect mates with a connector in a different configuration.

Manufacturing techniques may also be varied. For example, embodiments are described in which power conductive elements are formed into terminal subassemblies, which are then inserted into a connector housing. In some embodiments, power conductive elements may be separately inserted into a connector housing.

Connector manufacturing techniques were described using specific connector configurations as examples. A parallel board, right angle connector, that mates with a card edge was described as an example of a first connector. A second connector was illustrated as a vertical card edge connector. Either or both of these connectors may have other forms, including, for example, backplane connectors, cable connectors, stacking connectors, mezzanine connectors, I/O connectors, chip sockets, etc.

In some embodiments, contact tails were illustrated as posts suitable for a pin in holder solder attachment. However, other configurations may also be used, such as surface mount elements, pressfits, etc., as aspects of the present disclosure are not limited to the use of any particular mechanism for attaching connectors to printed circuit boards.

Terms such as "horizontal" and "vertical" were used to distinguish interfaces of an L-shaped connector. Horizontal and vertical directions may be determined relative to a surface of a printed circuit board to which the connector is mounted or, when the connector is not mounted to the board, the plane that a printed circuit board would occupy. However, such terms are indicate relative direction and the horizontal and/or vertical directions may be determined relative to other reference planes.

The present disclosure is not limited to the details of construction or the arrangements of components set forth in the foregoing description and/or the drawings. Various embodiments are provided solely for purposes of illustration, and the concepts described herein are capable of being practiced or carried out in other ways. Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. An electronic system, the electronic system comprising:
- a printed circuit board (PCB);
- a first connector comprising a first mating interface, a second mating interface, and a first mounting interface, wherein:
  - the first mating interface, the second mating interface and the first mounting interface are electrically connected, and
  - the first connector is mounted to the PCB at the first mounting interface;
- a second connector comprising a third mating interface, wherein:
  - the third mating interface and a second mounting interface are electrically connected, and
  - the second connector is mounted to the PCB at the second mounting interface; and
- a conductive interconnect separably connected to the second mating interface and the third mating interface.

2. The electronic system of claim 1, wherein the conductive interconnect is configured to carry in excess of 60 Amps.

3. The electronic system of claim 2, wherein the conductive interconnect is configured to carry in excess of 100 Amps.

4. The electronic system of claim 1, wherein the conductive interconnect comprises at least one busbar.

5. The electronic system of claim 1, wherein the conductive interconnect comprises at least one cabled interconnect.

6. The electronic system of claim 1, further comprising:
- a power supply separably connected to the first mating interface.

7. The electronic system of claim 6, wherein:
- the power supply is configured as at least a 60 Amp supply.

8. The electronic system of claim 6, wherein the power supply is configured to supply a maximum current between 160 Amps and 240 Amps.

9. A method of operating an electronic system comprising a printed circuit board (PCB), a first connector mounted to the PCB and comprising at least one mating interface, a second connector having at least one mating interface mounted to the PCB, and a plurality of electronic components mounted to the PCB, the method comprising:
- supplying power through a mating interface of the at least one mating interface of the first connector;
- distributing a first portion of the supplied power to the plurality of electronic components from the first connector through power planes in the PCB;
- distributing a second portion of the supplied power to the plurality of electronic components from the first connector through a conductive interconnect to the second connector and from the second connector through power planes in the PCB.

10. The method of claim 9, wherein distributing the first portion of the supplied power to the plurality of electronic components from the first connector through power planes in the PCB comprises distributing the first portion through 15 or fewer power planes.

11. The method of claim 9, wherein the first portion of the supplied power and the second portion of the supplied power are, in the aggregate, in excess of 60 Amps.

12. The method of claim 9, wherein the first portion of the supplied power and the second portion of the supplied power are, in the aggregate, in excess of 90 Amps.

13. The method of claim 9, wherein the first portion of the supplied power and the second portion of the supplied power are, in the aggregate, in excess of 180 Amps.

14. The method of claim 9, wherein
- the mating interface is a first mating interface of the first connector;
- the first connector comprises a second mating interface;
- the at least one mating interface of the second connector comprises a first mating interface; and
- the method further comprises connecting the conductive interconnect between the second mating interface of the first connector and the first mating interface of the second connector.

15. The method of claim 14, wherein:
- the conductive interconnect comprises at least two busbars comprising a first end and a second end;
- the second mating interface of the first connector and the first mating interface of the second connector each comprise at least one slot; and
- connecting the conductive interconnect between the second mating interface of the first connector and the first mating interface of the second connector comprises inserting first ends of the at least two busbars into the at least one slot of the second mating interface of the first connector and inserting second ends of the at least two busbars into the at least one slot of the first mating interface of the second connector.

16. The method of claim 15, wherein:

supplying power through a mating interface of the at least one mating interface of the first connector comprises supplying power from power supply unit comprising a card edge inserted into the first mating interface of the first connector.

17. The method of claim 16, wherein supplying power comprises supplying between 60 Amps and 100 Amps.

18. The method of claim 16, wherein supplying power comprises supplying between 160 Amps and 240 Amps.

19. An electrical connector, comprising:

a housing, comprising a first face, a second face and a third face, wherein a first interface is provided at the first face, a second interface is provided at the second face and a third interface is provided at the third face; and a plurality of conductive structures held within the housing, the plurality of conductive structures comprising a first set of mating contact portions, a second set of mating contact portions, and a set of mounting portions;

wherein:

for each of the plurality of conductive structures, mating contact portions of the first set of mating contact portions are electrically connected to respective mating contact portions of the second set of mating contact portions and respective mounting portions of the set of mounting portions;

the first set of mating contact portions comprise the first interface;

the second set of mating contact portions comprise the second interface;

the set of mounting portions comprise the third interface; and a mating direction of the first set of mating contact portions is transverse to a mating direction of the second set of mating contact portions.

20. The electrical connector of claim 19, wherein the mounting portions of the plurality of conductive structures comprise tails, and wherein each set of mating contact portions comprises a respective pair of fingers.

21. The electrical connector of claim 20, wherein the tails extend from the housing in a first direction.

22. The electrical connector of claim 21, wherein the second set of mating contact portions comprise conductive fingers extending in a second direction, orthogonal to the first direction, and wherein the first set of mating contact portions comprise conductive fingers extending parallel to the first direction.

23. The electrical connector of claim 19 in combination with a cable assembly, wherein the cable assembly is mated with the electrical connector at the second interface.

24. The electrical connector in the combination of claim 23, further comprising a power supply mated with the electrical connector at the first interface.

25. The electrical connector of claim 19, wherein the first interface is configured for mating with another connector.

* * * * *